United States Patent
Chang et al.

(10) Patent No.: US 9,341,710 B2
(45) Date of Patent: May 17, 2016

(54) SUB-CARRIER SUCCESSIVE APPROXIMATION MILLIMETER WAVE RADAR FOR HIGH-ACCURACY 3D IMAGING

(71) Applicant: THE REGENTS OF THE UNIVERSITY OF CALIFORNIA, Oakland, CA (US)

(72) Inventors: Mau-Chung Frank Chang, Los Angeles, CA (US); Adrian J. Tang, Pasadena, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/335,592

(22) Filed: Jul. 18, 2014

(65) Prior Publication Data

US 2015/0015432 A1     Jan. 15, 2015

Related U.S. Application Data (63) Continuation of application No. PCT/US2013/023319, filed on Jan. 25, 2013.

(60) Provisional application No. 61/591,349, filed on Jan. 27, 2012.

(51) Int. Cl.
    *G01S 13/38*     (2006.01)
    *G01S 7/20*     (2006.01)
    (Continued)

(52) U.S. Cl.
    CPC ............... *G01S 13/38* (2013.01); *G01S 7/032* (2013.01); *G01S 7/20* (2013.01); *G01S 13/90* (2013.01); *G01S 13/347* (2013.01); *G01S 13/887* (2013.01)

(58) Field of Classification Search
    CPC ............... G01S 13/89–13/9094; G01S 7/20; G01S 13/38
    USPC .................................................. 342/180, 127
    See application file for complete search history.

(56) References Cited

U.S. PATENT DOCUMENTS

| | | | | |
|---|---|---|---|---|
| 4,527,161 | A | * | 7/1985 | Wehner ............ 342/152 |
| 2007/0109177 | A1 | * | 5/2007 | Baath et al. ............ 342/124 |

(Continued)

FOREIGN PATENT DOCUMENTS

| | | |
|---|---|---|
| EP | 1711844 B1 | 10/2009 |
| WO | 2013/112955 A1 | 8/2013 |

OTHER PUBLICATIONS

Korean Intellectual Property Office (KIPO), International Search Report and Written Opinion, issued on May 15, 2013, for corresponding International Patent Application No. PCT US2013/023319 (pp. 1-9) and claims (pp. 10-13) pp. 1-13.

(Continued)

*Primary Examiner* — Matthew M Barker
(74) *Attorney, Agent, or Firm* — O'Banion & Ritchey LLP; John P. O'Banion (57) ABSTRACT

A sub-carrier successive approximation (SCSA) radar having a sufficiently high accuracy to capture 3D images of concealed objects. The invention is phase-based, and directly measures round trip time by estimating the phase delay of the carrier. One of its advantages is that the carrier does not need to sweep across a wide frequency range, thereby relaxing RF front-end bandwidth and linearity requirements. SCSA radar accuracy is limited only by the extent of system noise, allowing very high accuracy to be achieved with a sufficient integration period. The SCSA radar can be readily implemented in CMOS, as well as other device technologies, and fabricated within one or more small integrated circuits.

20 Claims, 8 Drawing Sheets

(51) Int. Cl.
  *G01S 7/03* (2006.01)
  *G01S 13/90* (2006.01)
  *G01S 13/34* (2006.01)
  *G01S 13/88* (2006.01)

(56) References Cited

U.S. PATENT DOCUMENTS

2008/0042895 A1 2/2008 Inaba
2008/0304044 A1 12/2008 Cooper et al.
2009/0079620 A1 3/2009 Van Caekenberghe et al.
2010/0090887 A1 4/2010 Cooper et al.

OTHER PUBLICATIONS

Cooper, et al. "Penetrating 3-D Imaging at 4- and 25-m Range Using a Submillimeter-Wave Radar," IEEE Transactions on Microwave Theory and Techniques. vol. 56, No. 12, Dec. 2008.

* cited by examiner

SUB-CARRIER SUCCESSIVE APPROXIMATION MILLIMETER WAVE RADAR FOR HIGH-ACCURACY 3D IMAGING

CROSS-REFERENCE TO RELATED APPLICATIONS

This application is a 35 U.S.C. §111(a) continuation of PCT international application number PCT/US2013/023319 filed on Jan. 25, 2013, incorporated herein by reference in its entirety, which claims priority to, and the benefit of, U.S. provisional patent application Ser. No. 61/591,349 filed on Jan. 27, 2012, incorporated herein by reference in its entirety. Priority is claimed to each of the foregoing applications.

The above-referenced PCT international application was published as PCT International Publication No. WO 2013/112955 on Aug. 1, 2013, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to radar systems, and more particularly to a sub-carrier successive approximation radar for 3D imaging.

2. Description of Related Art

Radar based automotive and object detection systems have gained increasing attention in recent years. Adding to this interest are applications which employ millimeter (mm) wave radar techniques to construct short range three-dimensional (3D) imaging for security screening and biomedical applications. Currently, these forms of mm-wave imagers have only been demonstrated using III-V technology, because CMOS-based radars suffer several range, resolution and accuracy limitations due to limited output power and linearity.

There are numerous radar systems for automotive and aerospace purposes that are based on Frequency-Modulated Continuous-Wave (FMCW) techniques. However, the resolution and accuracy of FMCW systems are typically limited by radar sweep linearity. In FMCW ranging, the carrier is swept to produce a frequency offset at the receiver output proportional to the round trip distance between the radar and target. Although FMCW could be a good approach for accurate ranging, implementation is particularly difficult at high frequencies because the resolution is heavily dependent on sweep-linearity and the high RF front-end performance required to support the wideband swept carrier. For 3D mm wave imaging applications, this high operating frequency is indispensable as the attainable spatial resolution is fundamentally limited by the wavelength of the imaging system. The use of higher frequencies also leads to relaxed focusing lens requirements, as the optical diffraction limit is set by the ratio of the radar wavelength over the lens aperture size.

Therefore, a need exists for mm-wave short range three-dimensional (3D) imaging systems that have increased accuracy while being more easily and cost-effectively implemented.

BRIEF SUMMARY OF THE INVENTION

The present invention generally comprises a radar system with a sufficiently high accuracy to capture 3D images of objects concealed either under the clothing of a person, or within small packages. The inventive system is a sub-carrier successive approximation radar, which will be often referred to herein using the abbreviated term SCSA radar, that operates based on successive phase approximation of the time-of-flight at different sub-carrier (intermediate (IF)) frequencies.

Instead of utilizing FMCW, the present invention is a phase-based radar which directly measures the round trip time by estimating the phase delay of the carrier. One of its unique advantages is that the frequency of the carrier does not need to be swept as in conventional radars, thereby relaxing RF front-end bandwidth and linearity requirements. Any level of desired accuracy may be achieved using the SCSA radar, with accuracy being limited only by the extent of system noise. In general, the accuracy is determined by the number of successive approximations performed, and the period over which the output radar signal is integrated. For example, providing that the target is a slow motion object, such as less than 10 meters per second (m/s), which is common for security screening, an integration time of 1 µs results in only 0.01 mm of distance inaccuracy and 0.008 mm of inaccuracy associated with the Doppler shift.

One issue, however, which limits the use of phase-based radar, is its intrinsic range ambiguity as the target travels beyond one wavelength of the carrier. This issue is overcome by using a sub-carrier successive approximation method according to the present invention.

As directly resolving the carrier phase at the intended frequency is quite difficult, the inventive embodiments conduct successive ranging measurements at increasing intermediate frequencies (IF) for range detection without distance ambiguity. For example, embodiments of the invention operating at of 144 GHz utilize increasing IF within the 1-400 MHz range. In one demonstrated SCSA embodiment with two steps, a coarse scan is first performed at an IF of 189 MHz and a 50% wavelength ranging decision is made. Then a fine scan follows, which is performed at 378 MHz to provide the higher accuracy. Finally, the coarse and fine scanning results are added to produce the final 3D image.

In one embodiment of the invention, a 144 GHz SCSA radar uses an SAR transmitter/receiver (Tx/Rx) which tracks round-trip phase of an intermediate frequency (IF) (sub-carrier) signal to and from the target being imaged.

In addition, in at least one embodiment of the invention, the IF signal is configured for operation at several frequencies to successively approximate the target distance. By using multiple frequencies that are related by powers of two (i.e., 100

MHz, 200 MHz, 400 MHz . . . and so forth), the ambiguity associated with conventional phase based radar can be alleviated and extremely high accuracy can be achieved.

The present invention can be implemented with a wide range of device technologies, including but not limited to Si CMOS, Si BiCMOS, HBT, HEMT or PHEMT, depending on the frequency, required accuracy, and target distance of the application for the SCSA radar system.

The present invention provides a number of advantages, of which the following are listed by example and not limitation. (1) SCSA radar provides high accuracy which is higher than that provided by FMCW or other radar techniques by at least ten fold (10×) due to the high operating frequencies. (2) SCSA phase based radar benefits from relaxed radio requirements, as it is narrowband with far more relaxed requirements on the transmitter and receiver than possible using wideband FMCW or pulsed-radar systems. (3) SCSA radar provides potentially unlimited accuracy. Unlike FMCW radar, where a carrier frequency sweeping is required, the accuracy of SCSA is limited only by signal noise, so increasing number of measurement iterations and integration time allows radar accuracy to be increased.

A prototype of the SCSA radar has been constructed using a 65 nm CMOS process, and successfully demonstrated at 144 GHz with better than 1 cm of accuracy at a one meter target distance. It appears that SCSA radar offers the highest achievable accuracy in radar systems to date. Applications for this system are widespread from security screening to aerospace and automotive navigation. The successive approximation method used herein can be readily implemented on existing carrier wave radar hardware, simplifying manufacture.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Figure 1A:
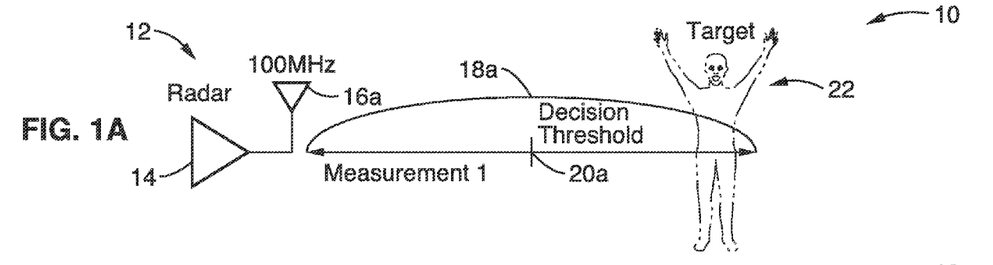
FIG. 1A through FIG. 1C depict a basic detection principle of the successive approximation sub-carrier radar according to embodiments of the present invention.
Figure 1B:
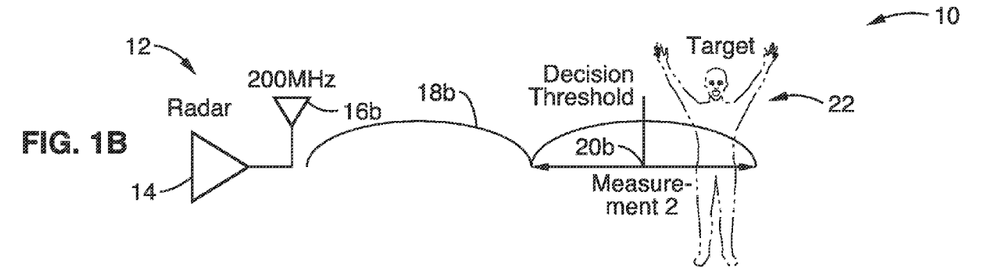
Figure 1C:
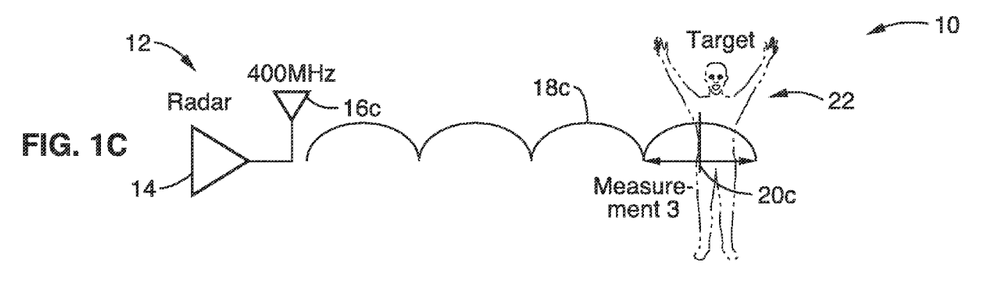

FIG. 1A through FIG. 1C show an embodiment 10 exemplifying the basic detection principle of the successive approximation sub-carrier radar. A radar system 12 is shown with transmitter and receiver (Tx/Rx) 14 and multiple intermediate (sub-carrier) frequencies, for example 100 MHz 16a in FIG. 1A, 200 MHz 16b in FIG. 1B, and 400 MHz 16c in FIG. 1C. A first measurement is seen with IF at 100 MHz with waveform 18a shown directed at target object (individual) 22. It can be seen in FIG. 1A that based on the decision threshold 20a, seen at mid-waveform, the target is more than a half wavelength away. The IF is increased (e.g., doubled) with waveform 18b, as seen in FIG. 1B, wherein the target is seen in the last half of the second waveform, based on the decision threshold 20b. IF is increased again in FIG. 1C with waveform 18c, with the target showing up near the center of the fourth waveform, with decision threshold 20c. A decision threshold is seen with each waveform, wherein depending on which side of the waveform is being reflected from the target, the next ranging decision is made. It should be appreciated that this method can provide extremely high accuracy.

The transmitter and receiver used in the SCSA radar may comprise any of a wide range of types, for example heterodyne or direct conversion, and either coherent or non-coherent. A circuit means for estimating round-trip phase delay of the IF signal (e.g., phase detector, and phase-locked loop or delay-locked loop circuit) is connected to the receiver output whose phase, or time delay, is compared with the IF signal used by the transmitter.

Figure 2A:
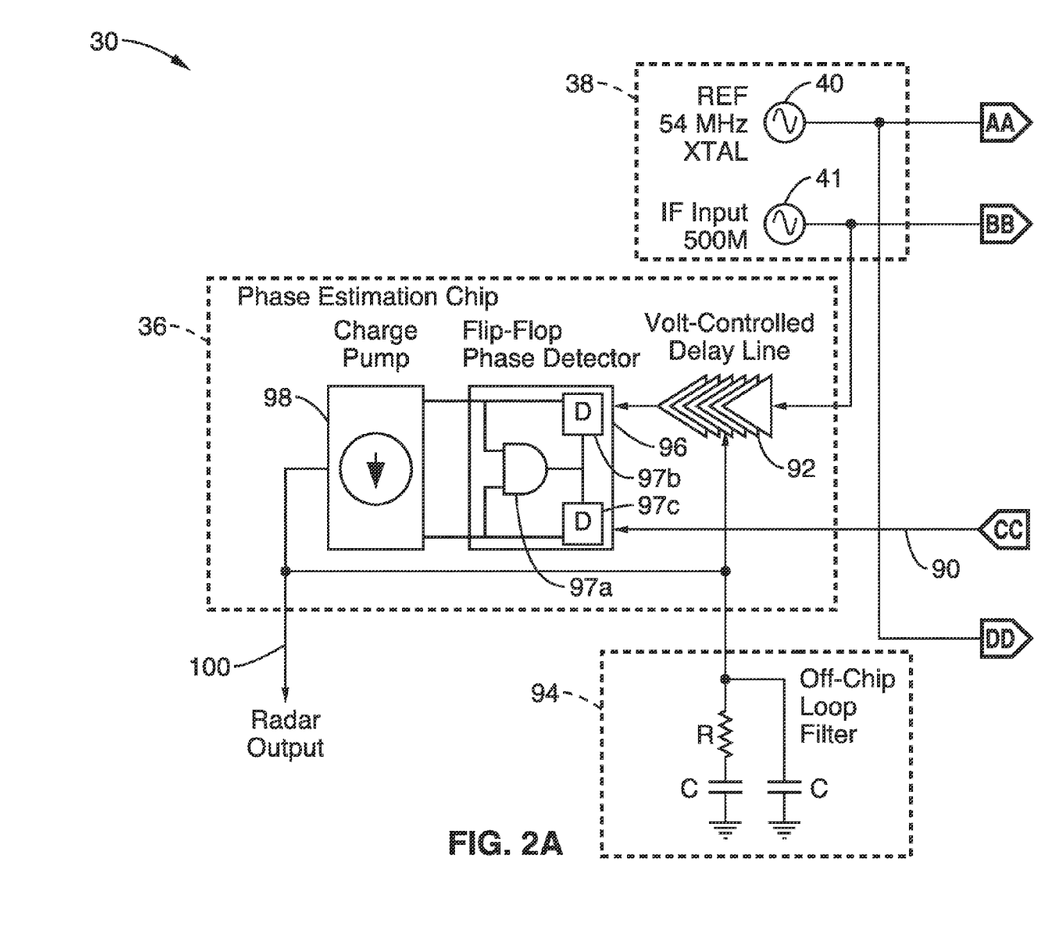
FIG. 2A and FIG. 2B is a block diagram of a successive approximation sub-carrier phase radar according to at least one embodiment of the present invention.
Figure 2B:
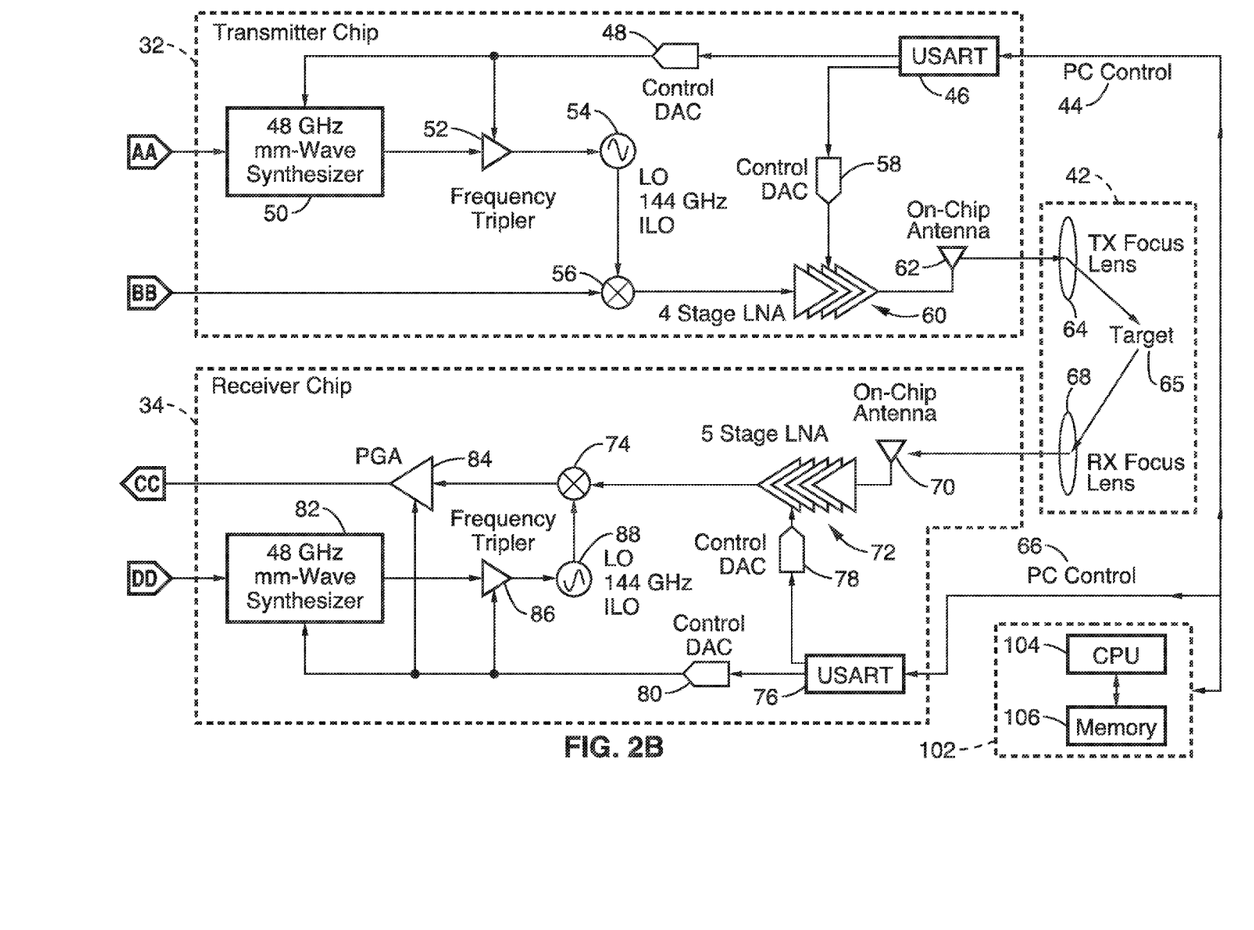

FIG. 2A and FIG. 2B illustrate an example embodiment 30 of an SCSA radar having three principle circuits, with a phase estimator 36 (FIG. 2A), along with transmitter (Tx) 32 and receiver (Rx) 34 (FIG. 2B). In at least one embodiment, these circuits are implemented within one or more integrated circuits (IC chips), such as transmitter chip, receiver chip, and phase estimator chip.

A set of external signals 38 (FIG. 2A) are seen used by the Tx 32, Rx 34 and phase estimator 36, such as comprising a reference signal 40 and IF input 41, which are exemplified as a 54 MHz crystal oscillator 40 and 500 MHz IF signal 41. A radar focusing means 42 (FIG. 2B) is shown comprising a Tx focus lens 64, and a Rx focus lens 68 which are each respectively directed toward a target 65.

In the transmitter 32 (FIG. 2B), a control signal 44 is received from a control circuit. In the embodiment shown, the control signal is a PC control signal which is received in the transmitter by a universal synchronous/asynchronous receiver transmitter (USART) 46, with the receiver circuit preferably utilizing a similar configuration. One of ordinary skill in the art will appreciate that (1) any number of different control circuit types may be utilized (processor-based, logic arrays, ASICs, and the like), and similarly (2) any control interfaces (e.g., serial, parallel, direct memory access, wireless, and so forth), may be utilized without departing from the teachings of the present invention. By way of example and not limitation, these control signals are seen generated from at least one computer processor 104 operating in conjunction with at least one memory 106, such as within one or more external or internal computer circuits or devices 102. It will be appreciated that programming stored on memory 106 (which may include solid state memory, computer-readable media, or combinations thereof), is executable on computer processor 104. The present invention is non-limiting with regard to memory and computer-readable media, insofar as these are non-transitory, and thus these memories do not merely constitute a transitory electronic signal.

In response to the received control signals, a digital-to-analog converter (DAC) 48 is operated and provides an output voltage coupled to a frequency synthesizer 50, depicted as a 48 GHz mm-wave synthesizer, which also receives reference signal 40. Output from frequency synthesizer 50 is received by a frequency multiplier 52, exemplified as a frequency tripler. The multiplied frequency is input to a local oscillator 54 (LO 144 GHz ILO) and output to a mixer 56 which also receives the IF input 41. Output from mixer 56 is input to a power amplifier (PA) 60, exemplified as a four stage PA controlled by a DAC 58 in response to control signals 44. Output from PA 60 is directed to an antenna 62 (e.g., preferably on-chip) which is directed through lens 64 to the target 65.

It should be noted that in the present embodiment many of the circuit devices are under computer control. For example, the PA and LNA are computer controlled, wherein their gain, and other desired parameters, may be tuned for the conditions, such as the specific frequency of operation. Using these computer controlled stages, system performance is optimized by the present invention for the application and conditions.

The receiver 34 (FIG. 2B) has a similar configuration as the transmitter 32. A control signal path 66 is shown as a PC control signal, such as connected to a USART 76. A radar reflectance signal is received from the target 65 through focus lens 68 to antenna 70, which is then amplified 72, preferably using some form of low-noise amplifier (LNA) 72, exemplified herein as a five stage LNA controlled through DAC 78 operated from control signals received at USART 76. Output of the amplified return signal is directed at a mixer 74. The other signal to mixer 74 is from a local oscillator 88 in response to a signal from frequency synthesizer 82, controlled by DAC 80 through USART 76, to a frequency multiplier 86, such as a frequency tripler, whose output is received by local oscillator 88. Output from mixer 74 is received by programmable gain amplifier (PGA) 84, whose output 90 is received by phase estimator 36.

Phase estimator 36 is seen receiving IF input 41 signal as well as the amplified receiver signal 90 from PGA 84. The IF input 41 is received by a voltage controlled delay line 92, shown coupled to a loop filter 94, depicted as being an off-chip circuit with a resistor R and two capacitors C, although various forms of filters may be alternatively utilized. The loop filter directs feedback from the radar output 100 to the delay line 92. The receiver output 90 and output from the voltage controlled delay line 92 are received by a phase detector 96, exemplified as comprising an AND gate 97a and D flip-flops 97b, 97c. Dual outputs from the phase detector 96 drive a charge pump 98 and outputs the radar output 100. The time delay of the received signal is determined by the loop which locks the time delay of the voltage controlled delay line to match the delay to which the received signal was subject.

As was seen in FIG. 2B, the transmitter (Tx) and receiver (Rx) chips contain a 48 GHz mm-wave synthesizer 50, 82, respectively, which is cascaded with a non-linear amplifier to generate a large 3rd order harmonic and provide a sub-harmonic injection locking to a 144 GHz oscillator used for the LO. Both Tx and Rx synthesizers are locked to the same reference signal 40, or oscillator crystal, to enable the desired coherent phase detection. Transmitter 32 up-converts the IF signal to a 144 GHz double-sideband signal (DSB) and broadcasts it to the target via a 5-stage caterpillar (named for its layout shape) power amplifier (PA) 60, preferably with an on-chip antenna 62. A simple embodiment can be implemented with the on-chip antenna formed by simply lifting floating bondwires onto the output pads to form a crude dipole antenna. The antenna gain is not high (less than −10 dBi), yet can be quite sufficient to fulfill the SNR requirements of the radar system. At the receiver 34, the 144 GHz signal received back from the target reflection is amplified by a 5 stage caterpillar low-noise amplifier (LNA) 72 and down-converted. As the IF is quite low versus the carrier frequency, the narrow bandwidth associated with a 5 stage amplifier is still enough to support the signal.

The phase estimation circuit is exemplified using a delay-locked loop (DLL) with a D-flip-flop phase detector 96 and a current steering charge pump 98. The delay line 92 is implemented in this example embodiment using a current-starved CMOS inverter chain. The DLL chip copies the IF signal at the input of the transmitter and then tracks the phase of the received signal. This causes the control voltage of the DLL to be proportional to the round trip distance. The Tx, Rx and phase estimation circuits may be separately implemented in separate integrated circuits, or the phase estimator combined with the Tx or Rx integrated circuits, or the functions combined in a single integrated circuit or divided up as desired without departing from the teachings of the present invention. It should be appreciated that the integration of the distance information from the radar can be performed in any desired manner. For example, integration may be performed by a computer processor, or dedicated circuitry (e.g., analog integration) or any desired forms of analog or digital signal processing. In the embodiments described, an integration time of approximately 1 μs was found to provide sufficient accuracy while obtaining fast response times.

The LNA and PA are exemplified as being laid out as caterpillar amplifiers, based on transformer coupled stages. The LNA in this example embodiment uses cascode stages, while the PA uses common source stages, as the Tx gain required is lower. At each stage the bias for the amplification and cascode device is set by a control DAC. Control DACs are also used to adjust the bias of the frequency tripler, the VCO tuning and the divider current control in the mm-wave synthesizer. Each control DAC (e.g., 8-bit R2R ladder) is exemplified as being driven from a USART module which is controlled by an external controller, such as a personal computer (PC), or any other control signal source.

Figure 3A:
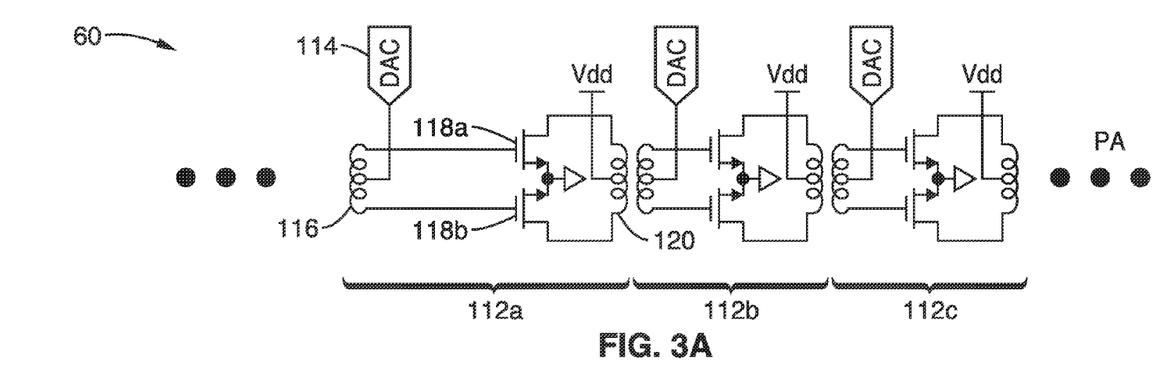
FIG. 3A and FIG. 3B are schematics of a multistage power amplifier (PA) and low-noise amplifier (LNA) as shown in the block diagram of FIG. 2, according to at least one embodiment of the present invention.
Figure 3B:
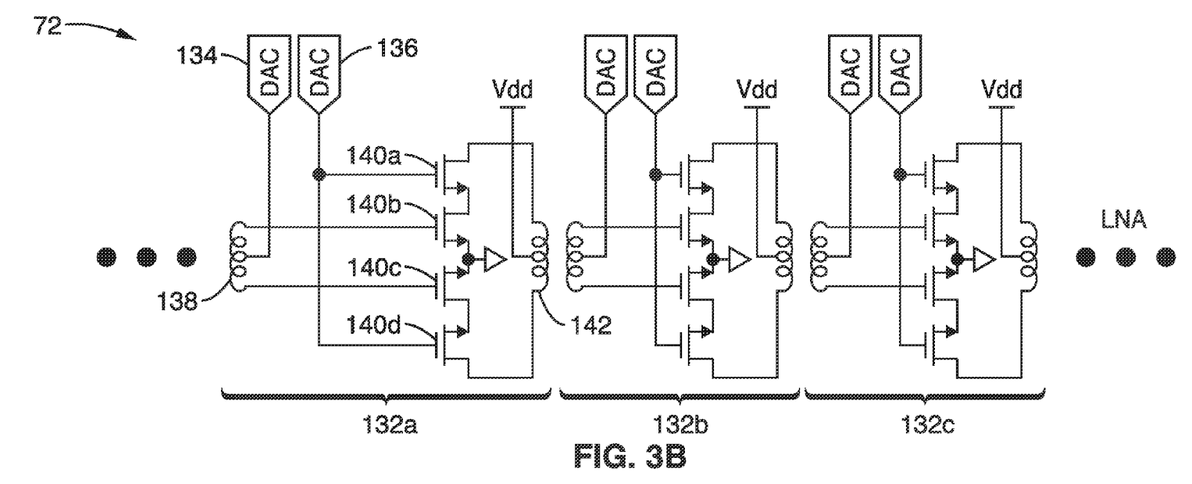

FIG. 3A and FIG. 3B illustrate example embodiments of a power amplifier (PA) 60, and low-noise amplifier (LNA) 72. In FIG. 3A it can be seen that the PA comprises multiple stages, exemplified by showing three of the stages 112a, 112b, 112c. Each of these stages is shown having a transformer 116 coupled to the previous stage, with an input from a DAC 114 connected to a center tap of the input winding. The transformer is coupled across transistors 118a, 118b to drive an output transformer winding 120 whose center tap is connected to a supply input (e.g., Vdd). The low-noise amplifier is shown similarly configured, with three of its stages 132a, 132b, and 132c shown coupled together. Each of these stages is shown having a transformer 138 coupled to the previous stage, with an input from a DAC 134 connected to a center tap of the input winding. The transformer is coupled across a first pair of transistors 140b, 140c. A second pair of transistors 140a, 140d, is coupled in line with the first pair and gated from DAC 136 output. Output from the transistor stage drives output transformer winding 142 whose center tap is connected to a supply input.

Figure 4A:
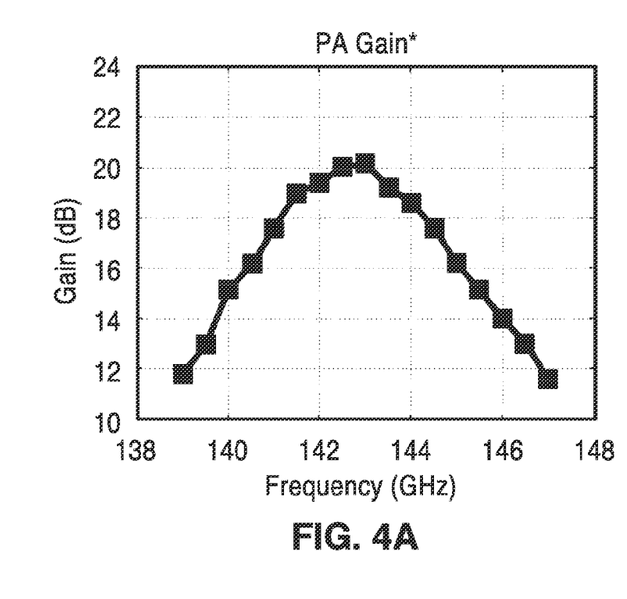
FIG. 4A and FIG. 4B are graphs of gain versus frequency for the PA and LNA circuits shown in FIG. 3A and FIG. 3B.
Figure 4B:
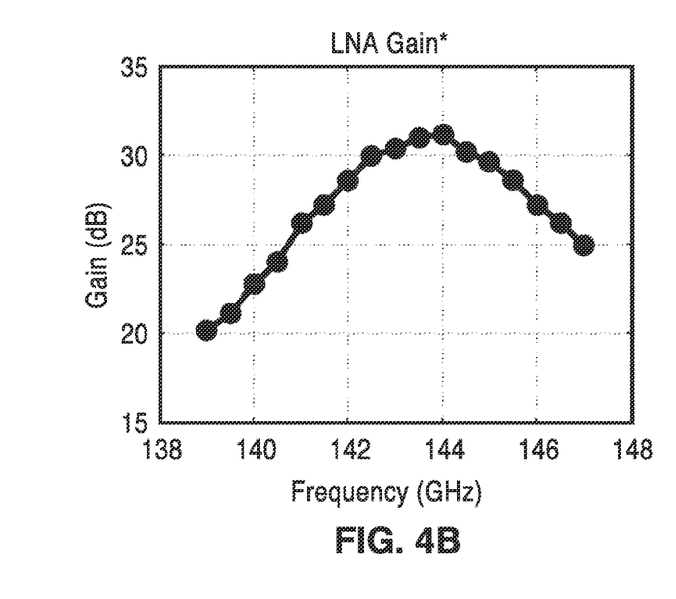

FIG. 4A and FIG. 4B depict, respectively, gain versus frequency for the PA and LNA. It should be appreciated that the structure of the PA and LNA are described by way of example, and not limitation. The invention can be implemented utilizing a range of PA and LNA designs without departing from the present invention.

Figure 5:
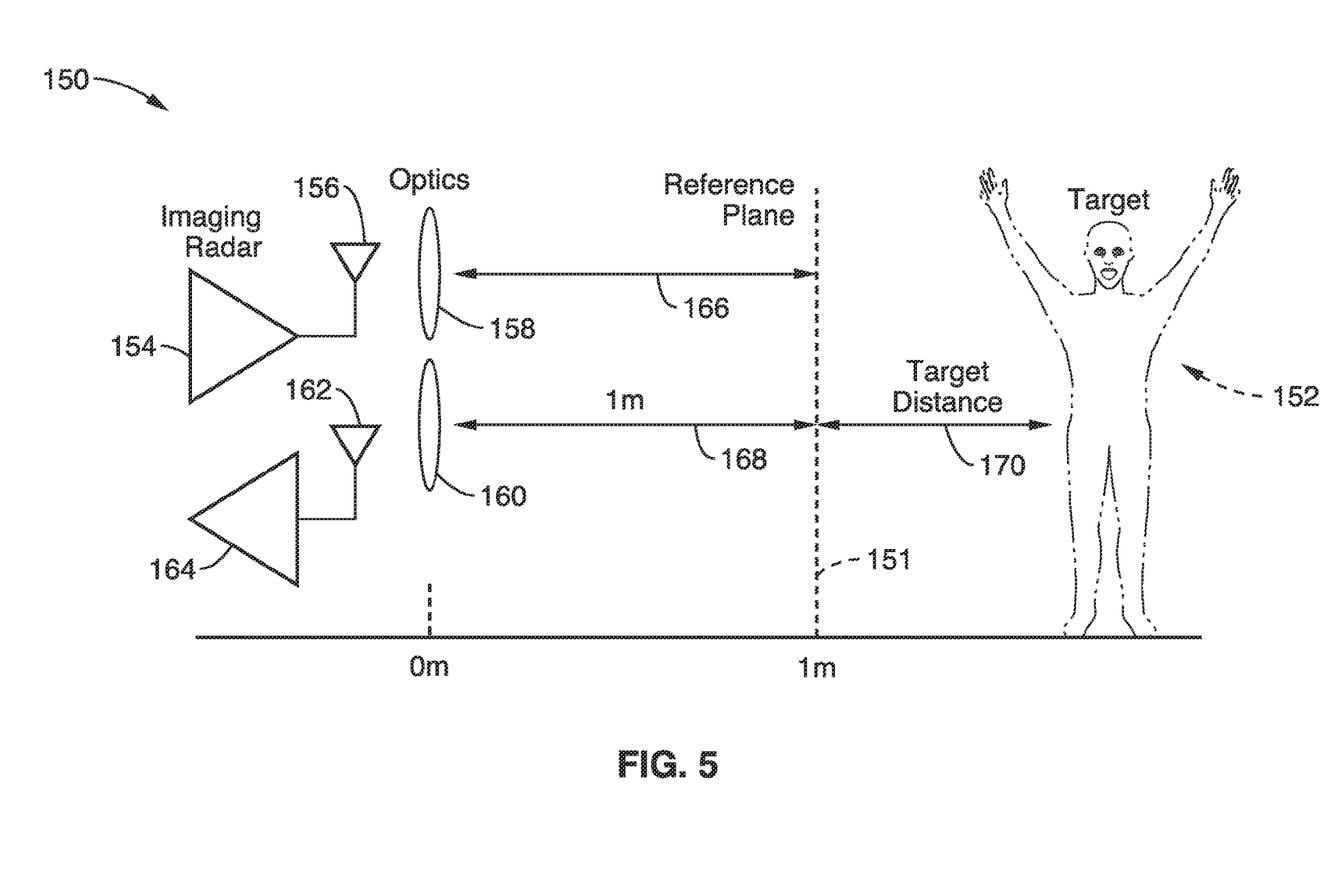
FIG. 5 is a block diagram showing the spatial relationship of a reference plane between the target and imaging radar, according to embodiments of the present invention.

FIG. 5 illustrates an embodiment 150 showing the definition of target distance 170 in relation to a reference plane 151 (e.g., at one meter). The diagram shows that the target distance is defined as being the distance from this 1 m reference plane 151. In the figure, a target is seen 152, upon which radar Tx 154 is directed through antenna 156 and lens 158 to output signal 166. A reflective signal 168 is also seen received through lens 160 to radar antenna 162 and radar receiver 164. Target distance 170 is defined as being from the reference plane 151 to the target 152.

Figure 6:
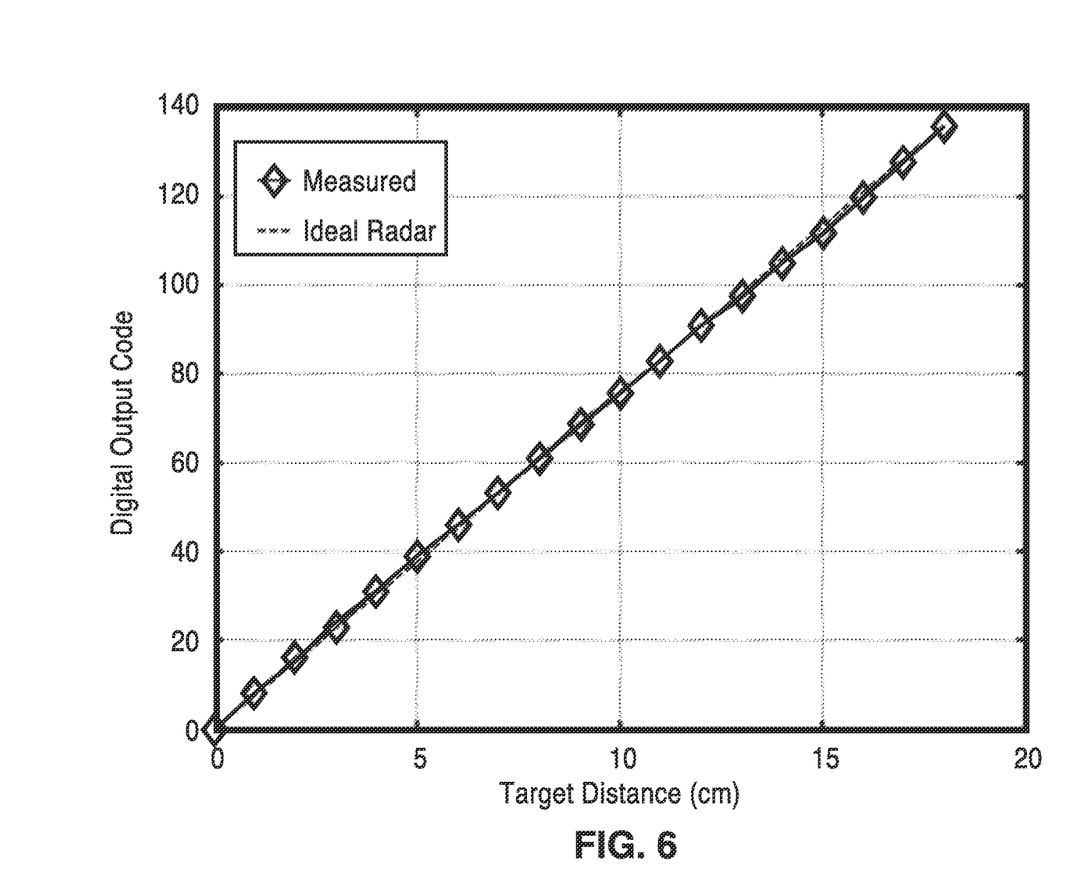
FIG. 6 is a graph comparing distance measurements from the inventive successive approximation sub-carrier phase radar with an ideal radar.

FIG. 6 depicts measured distance results for the demonstration SCSA embodiment, shown with diamond shaped datum points on a solid line, in comparison with an ideal result curve shown with a dashed line. As a result of the high accuracy of the SCSA radar, the curve of measured distance overlies the curve of ideal operation.

In demonstrating operation of the SCSA radar, a bistatic lens arrangement was utilized, however, a beam-splitter can be readily added in to simplify the optics. In this demonstration, the distance response, INL (less than 0.15 cm), and DNL (less than 0.76 cm) was measured with an external 8-bit ADC. Higher resolution ADC devices (e.g., 10, 12, 14, or 16 bits, and so forth) can be utilized to increase measurement resolution.

Figure 7A:
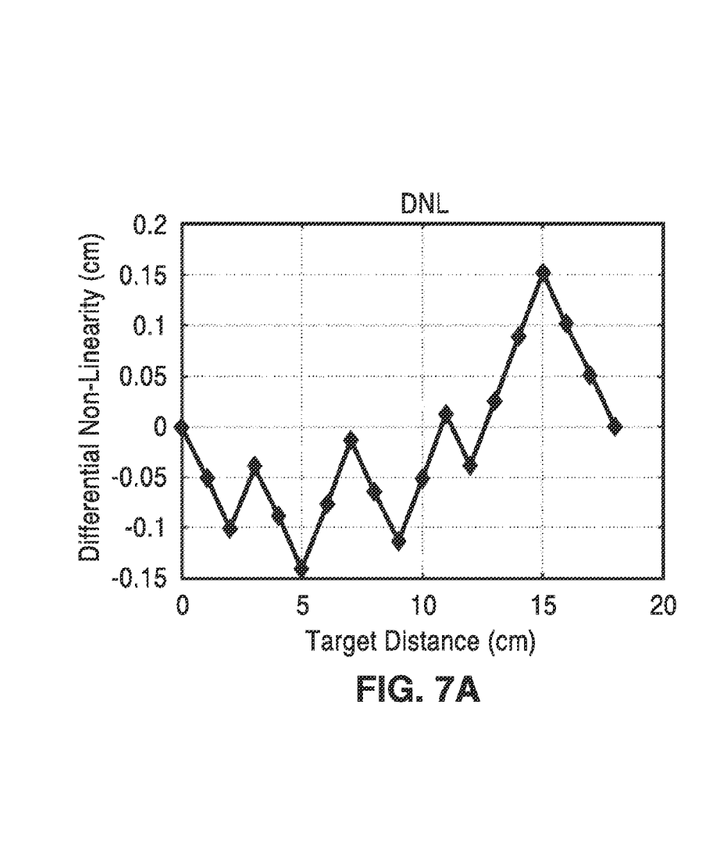
FIG. 7A and FIG. 7B are graphs of differential non-linearity (DNL) and integrated non-linearity (INL) successive approximation sub-carrier phase radar according to an embodiment of the present invention.
Figure 7B:
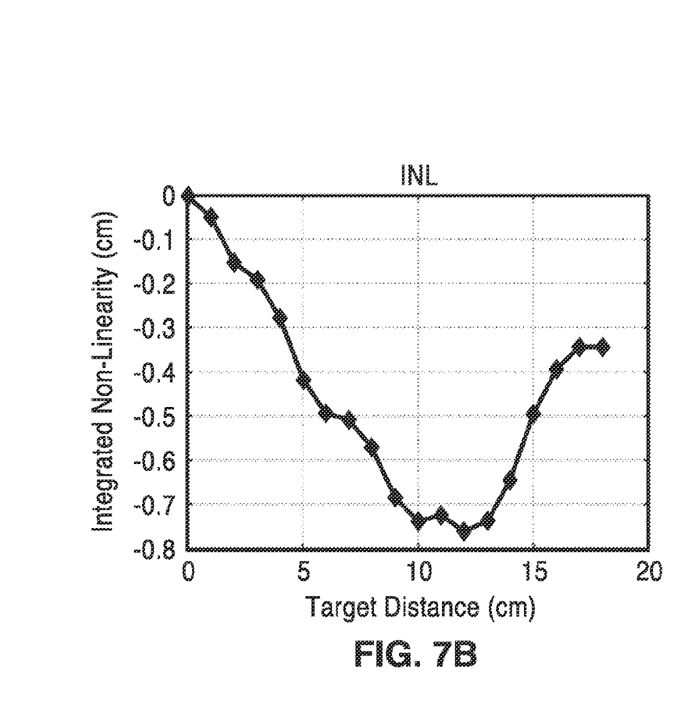

FIG. 7A and FIG. 7B illustrate results for differential non-linearity (DNL), and integrated non-linearity (INL), respectively.

In order to demonstrate the 3D imaging capability of the inventive sub-carrier SAR radar, a replica handgun and a roll of tape were imaged using a mechanical scanning stage placed in front of the radar. The high 144 GHz carrier provided excellent spatial / depth accuracy (e.g., approximately 2 cm/1 cm) which captured the details of both the handgun and tape at over a one meter target distance.

Table 1 summarizes SCSA radar Tx and Rx front end performance. Table 2 provides an overall performance summary. Table 3 shows a comparison of the SCSA radar with other current radars found in the literature.

The SCSA radar demonstrates about fifty times (×50) better depth accuracy than that of the best FMCW CMOS radar at 77 GHz and three times (×3) better than that of the best FMCW III-V radar. In addition, it provides about five times (×5) improvement in cross (pixel) accuracy than that of the reference radar systems. In the implemented embodiment, the total die area of the Tx, Rx and phase estimator chips was 5.62 mm$^2$. Power consumption for the entire radar system was 457 mW.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the invention can be embodied in various ways, including the following:

1. An apparatus for three dimensional radar imaging, comprising: (a) a radar transmitter configured for transmitting a millimeter wave carrier signal, wherein said carrier signal contains a sub-carrier signal at a frequency lower than said carrier signal, and wherein said radar transmitter transmits at a target; (b) a radar receiver configured for receiving a reflected signal from the target; (c) a phase estimator configured for tracking round-trip phase of said sub-carrier signal as an intermediate frequency (IF) signal to and from the target; (d) a computer processor coupled to said radar transmitter, said radar receiver, and said phase estimator; and (e) programming executable on said computer processor for performing steps comprising: (i) increasing the frequency of said sub-carrier within each of the multiple ranging measurements wherein a scanning result is obtained and integrated as an integrated scanning result; (ii) making a ranging decision for a subsequent ranging measurement in each said ranging measurement within said multiple ranging measurements; and (iii) generating a 3D image in response to adding integrated scanning results obtained during said multiple ranging measurements.

2. The apparatus of any preceding embodiment, wherein said radar transmitter transmits a double-sideband signal.

3. The apparatus of any preceding embodiment, wherein the frequencies of said sub-carrier signal are increased by powers of two during said multiple ranging measurements.

4. The apparatus of any preceding embodiment, wherein three dimensional radar imaging is obtained without requiring a sweeping carrier signal frequency.

5. The apparatus of any preceding embodiment, wherein a measurement accuracy is determined in response to the number of iterations performed of said multiple ranging measurements, within limits imposed by system noise.

6. The apparatus of any preceding embodiment, wherein the target is moving at less than 10 meters per second.

7. The apparatus of any preceding embodiment, wherein said radar apparatus comprises a synthetic aperture radar (SAR).

8. The apparatus of any preceding embodiment, wherein said phase estimator comprises a phase detector within a phase-locked loop or delay-locked loop circuit.

9. The apparatus of any preceding embodiment, wherein said phase estimator comprises a delay-locked loop circuit having a controllable delay line configured for locking the IF input signal based on delay between the transmitted signal and the reflected signal received by said radar receiver.

10. An apparatus for three dimensional radar imaging, comprising: (a) a radar transmitter configured for transmitting a millimeter wave carrier signal, wherein said carrier signal contains a sub-carrier signal at a frequency lower than said carrier signal, and wherein said radar transmitter transmits at a target; (b) a radar receiver configured for receiving a reflected signal from the target; (c) a phase estimator configured for tracking round-trip phase of said sub-carrier signal, as an intermediate frequency (IF) signal to and from the target; (d) a computer processor coupled to said radar transmitter, said radar receiver, and said phase estimator; and (e) programming executable on said computer processor for performing steps comprising: (i) increasing the frequency of said sub-carrier, by powers of two, within each of multiple ranging measurements wherein a scanning result is obtained and integrated as an integrated scanning result; (ii) making a ranging decision for a subsequent ranging measurement in each said ranging measurement within said multiple ranging measurements; and (iii) generating a 3D image in response to adding integrated scanning results obtained during said multiple ranging measurements.

11. The apparatus of any preceding embodiment, wherein said radar transmitter transmits a double-sideband signal.

12. The apparatus of any preceding embodiment, wherein three dimensional radar imaging is obtained with said apparatus without the need of sweeping the carrier signal frequency.

13. The apparatus of any preceding embodiment, wherein an accuracy is determined in response to how many iterations of said multiple ranging measurements are performed, within limits imposed by system noise.

14. The apparatus of any preceding embodiment, wherein the target is moving at less than 10 meters per second.

15. The apparatus of any preceding embodiment, wherein said radar apparatus comprises a synthetic aperture radar (SAR).

16. The apparatus of any preceding embodiment, wherein said phase estimator comprises a phase detector within a phase-locked loop or delay-locked loop circuit.

17. The apparatus of any preceding embodiment, wherein said phase estimator comprises a delay-locked loop circuit having a controllable delay line configured for locking the IF input signal based on delay between the transmitted signal and the reflected signal received by said radar receiver.

18. A method of performing three-dimensional radar imaging, comprising the steps of: (a) transmitting a millimeter wave carrier signal containing a sub-carrier signal at a frequency lower than said carrier signal, at a target; (b) receiving the carrier signal with sub-carrier signal, as reflected from the target; (c) performing phase estimation on round-trip phase of said sub-carrier, as an intermediate frequency (IF) signal to and from the target; (d) increasing frequency of said sub-carrier within each of multiple ranging measurements at which a scanning result is obtained and integrated as an integrated scanning result; (e) making a ranging decision for a subsequent ranging measurement in each said ranging measurement within said multiple ranging measurements; and (f) generating a 3D image in response to adding integrated scanning results obtained during said multiple ranging measurements.

19. The method recited in any preceding embodiment, wherein a double-sideband signal is transmitted.

20. The method recited in any preceding embodiment, wherein said increasing frequency of said sub-carrier is changed by powers of two during said multiple ranging measurements.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

SCSA Radar Tx and Rx Front End Performance Summary

| Transmitter Performance | | |
|---|---|---|
| Saturated Output Power | 10.1 | dBm |
| PA Gain | 20.5 | dB [a] |
| Output P1 dB | 7.3 | dBm |
| Tx 3 dB Bandwidth | 6.1 | Ghz [a] |
| Receiver Performance | | |
| Rx Noise Figure | 12.5 | dB |
| Rx Gain | 40-62 | dB [a] |
| LNA 3 dB Bandwidth | 5.1 | GHz [a] |
| 144 GHz ILO Performance | | |
| Phase Noise | −87 dBc/Hz @ 1 MHz [b] | |

[a] Simulated value as measurements not accessible from integrated circuit.
[b] Measured from stand-alone test chip.

TABLE 2

SCSA Radar Overall Performance Summary

| Transmitter Summary | | |
|---|---|---|
| Saturated Output Power | 10.1 | dBm |
| Power Dissipation | 219 | mW |
| Die Area | 2.32 | mm$^2$ |
| Receiver Summary | | |
| Power Dissipation | 214 | mW |
| Die Area | 2.70 | mm$^2$ |
| Overall Noise Figure | 16 | dB |

TABLE 2-continued

SCSA Radar Overall Performance Summary

Phase Estimator Summary

| | |
|---|---|
| Power Dissipation | 24 mW |
| Die Area | 0.63 mm$^2$ |

System Performance

| | |
|---|---|
| Cross (pixel) Accuracy | 2.0 cm with 14 cm lens |
| Depth Accuracy | 0.8 cm using a 2 μs integration time |
| Maximum Range | 2.0 m with a −10 dB reflection coefficient |

TABLE 3

Comparison of Inventive Radar with State-of-art mm-wave Radars

| Radar Characteristic | FMCW [1] | FMCW [2] | FMCW [3] | SCSA Radar |
|---|---|---|---|---|
| Cross (pixel) Accuracy | >10 cm @ 1 m | 3.0 cm @ 15 m | >10 cm @ 1 m | <2.0 cm @ 1 m |
| Depth Accuracy | >50 cm | 3.0 cm[a] | N/A | >0.76 cm[b] |
| Pwr Dissipation (mW/pixel) | 243 mW | >10 W | N/A | 457 mW |
| Total Area | 1.05 mm$^2$ | Discrete | N/A | 5.62 mm$^2$ |
| Frequency | 77 GHz | 600 GHz | 77 GHz | 144 GHz |
| Device Tech. | 65 nm CMOS | III-V HBT | 65 nm CMOS | 65 nm CMOS |

[1] Yi-An Li, Meng-Hsiung Hung, Shih-Jou Huang, Jri Lee "A fully integrated 77 GHz FMCW radar system in 65 nm CMOS", IEEE International Solid-State Circuits Conference 2010, pp 216-217, February 2010.
[2] Ken B. Cooper, Robert J. Dengler, Nuria Llombart, Tomas Bryllert, Goutam Chattopadhyay, Erich Schlecht, John Gill, Choonsup Lee, Anders Skalare, Imran Mehdi, and Peter H. Siegel "Penetrating 3-D Imaging at 4 and 25 m Range Using a Submillimeter-Wave Radar" IEEE MTT, Vol 56, No. 12, December 2008, pp 2771-2778.
[3] Sakurai H, Kobayashi, Mitomo T, Watanabe O, Otaka S, "A 1.5 GHz-modulationrange 10 ms-modulation-period 180 kHzrms-frequency-error 26 MHz-reference mixed mode FMCW synthesizer for mm-wave radar application", IEEE International Solid-State Circuits Conference 2011, pp 292-294, February 2011.
[a]Based on a 14 cm lens diameter.
[b]With a 2 μs integration time.

What is claimed is:

1. An apparatus for three dimensional radar imaging, comprising:
   (a) a radar transmitter configured for transmitting a millimeter wave carrier signal, wherein said carrier signal contains a sub-carrier signal at a frequency lower than said carrier signal, and wherein said radar transmitter transmits at a target;
   (b) a radar receiver configured for receiving a reflected signal from the target;
   (c) a phase estimator configured for tracking round-trip phase of said sub-carrier signal as an intermediate frequency (IF) signal to and from the target;
   (d) a computer processor coupled to said radar transmitter, said radar receiver, and said phase estimator; and
   (e) a memory having computer readable instructions stored thereon which when executed cause the computer processor to perform steps comprising:
      (i) scanning the target by increasing the frequency of said sub-carrier in successive steps within each of multiple ranging measurements in successive approximations for estimating range to the target, and for generating scanning imaging results at each successive step;
      (ii) establishing a decision threshold at 50% wavelength of said sub-carrier frequency in each successive step of increasing sub-carrier frequency;
      (iii) making a ranging decision within each successive step of increasing sub-carrier frequency to determine if target position lies beyond the decision threshold in response to determining from phase estimation whether the target is less than, or greater than, one-half wavelength away from the radar in a first ranging decision or from the previous decision threshold in subsequent ranging decisions;
      (iv) generating information on range between the radar and the target from successively approximating target distance using multiple frequencies of said sub-carrier signals to overcome range ambiguity as the target travels beyond one wavelength of the carrier; and
      (v) generating a 3D image in response to scanning the target to produce scanning imaging results which are integrated into a 3D image.

2. The apparatus recited in claim 1, wherein said radar transmitter transmits a double-sideband signal.

3. The apparatus recited in claim 1, wherein the frequencies of said sub-carrier signal are increased by powers of two during said multiple ranging measurements.

4. The apparatus recited in claim 1, wherein three dimensional radar imaging is obtained without requiring a sweeping carrier signal frequency.

5. The apparatus recited in claim 1, wherein a measurement accuracy increases in response to performing additional iterations, as successive approximations, within said multiple ranging measurements, within limits imposed by system noise.

6. The apparatus recited in claim 1, wherein the target is moving at less than 10 meters per second.

7. The apparatus recited in claim 1, wherein said radar apparatus comprises a synthetic aperture radar (SAR).

8. The apparatus recited in claim 1, wherein said phase estimator comprises a phase detector within a phase-locked loop or delay-locked loop circuit.

9. The apparatus recited in claim 1, wherein said phase estimator comprises a delay-locked loop circuit having a controllable delay line configured for locking the IF input signal based on delay between the transmitted signal and the reflected signal received by said radar receiver.

10. An apparatus for three dimensional radar imaging, comprising:
   (a) a radar transmitter configured for transmitting a millimeter wave carrier signal, wherein said carrier signal contains a sub-carrier signal at a frequency lower than said carrier signal, and wherein said radar transmitter transmits at a target;
   (b) a radar receiver configured for receiving a reflected signal from the target;
   (c) a phase estimator configured for tracking round-trip phase of said sub-carrier signal, as an intermediate frequency (IF) signal to and from the target;
   (d) a computer processor coupled to said radar transmitter, said radar receiver, and said phase estimator; and (e) a memory having computer readable instructions stored thereon which when executed cause the computer processor to perform steps comprising:
  (i) scanning the target by increasing the frequency of said sub-carrier, in successive steps by powers of two, within each of multiple ranging measurements in successive approximations for estimating range to the target, and for generating scanning imaging results at each successive step;
  (ii) establishing a decision threshold at 50% wavelength of said sub-carrier frequency in each successive step of increasing sub-carrier frequency;
  (iii) making a ranging decision within each successive step of increasing sub-carrier frequency to determine if target position lies beyond the decision threshold in response to determining from phase estimation whether the target is less than, or greater than, one-half wavelength away from the radar in a first ranging decision, or from the previous decision threshold in subsequent ranging decisions;
  (iv) generating information on range between the radar and the target from successively approximating target distance using multiple frequencies of said sub-carrier signals to overcome range ambiguity as the target travels beyond one wavelength of the carrier; and
  (v) generating a 3D image in response to scanning the target to produce scanning imaging results which are integrated into a 3D image.

11. The apparatus recited in claim 10, wherein said radar transmitter transmits a double-sideband signal.

12. The apparatus recited in claim 10, wherein three dimensional radar imaging is obtained with said apparatus without the need of sweeping the carrier signal frequency.

13. The apparatus recited in claim 10, wherein accuracy increases in response to performing additional iterations, as successive approximations, within said multiple ranging measurements, within limits imposed by system noise.

14. The apparatus recited in claim 10, wherein the target is moving at less than 10 meters per second.

15. The apparatus recited in claim 10, wherein said radar apparatus comprises a synthetic aperture radar (SAR).

16. The apparatus recited in claim 10, wherein said phase estimator comprises a phase detector within a phase-locked loop or delay-locked loop circuit.

17. The apparatus recited in claim 10, wherein said phase estimator comprises a delay-locked loop circuit having a controllable delay line configured for locking the IF input signal based on delay between the transmitted signal and the reflected signal received by said radar receiver.

18. A method of performing three-dimensional radar imaging, comprising the steps of:
  (a) transmitting a millimeter wave carrier signal containing a sub-carrier signal at a frequency lower than said carrier signal, at a target;
  (b) receiving the carrier signal with sub-carrier signal, as reflected from the target;
  (c) performing phase estimation on round-trip phase of said sub-carrier, as an intermediate frequency (IF) signal to and from the target;
  (d) scanning the target by increasing frequency of said sub-carrier in successive steps within each of multiple ranging measurements in successive approximations for estimating range to the target, and for generating scanning imaging results at each successive step;
  (e) establishing a decision threshold at 50% wavelength of said sub-carrier frequency in each successive step of increasing sub-carrier frequency;
  (f) making a ranging decision within each successive step of increasing sub-carrier frequency to determine if target position lies beyond the decision threshold in response to determining from phase estimation whether the target is less than, or greater than, one-half wavelength away from the radar in a first ranging decision, or from the previous decision threshold in subsequent ranging decisions;
  (g) generating information on ranqe between the radar and the target from successively approximating target distance using multiple frequencies of said sub-carrier signals to overcome range ambiguity as the target travels beyond one wavelength of the carrier; and
  (h) generating a 3D image in response to scanning the target to produce scanning imaging results which are integrated into a 3D image.

19. The method recited in claim 18, wherein a double-sideband signal is transmitted.

20. The method recited in claim 18, wherein said increasing frequency of said sub-carrier is changed in steps by powers of two during said multiple ranging measurements.

* * * * *